June 4, 1963

O. BROWN 3,092,355

VARIABLE-WING SUPERSONIC AIRCRAFT

Filed April 27, 1948

Owen Brown,
INVENTOR.

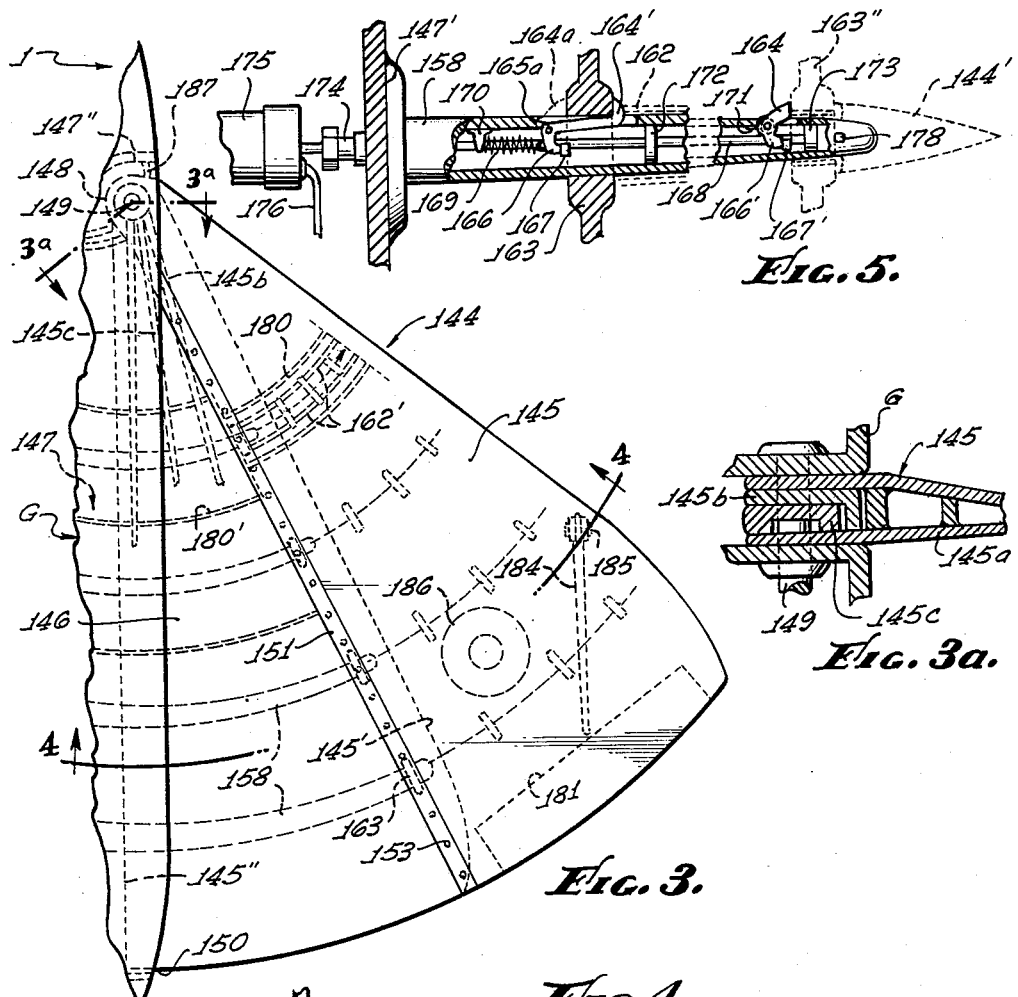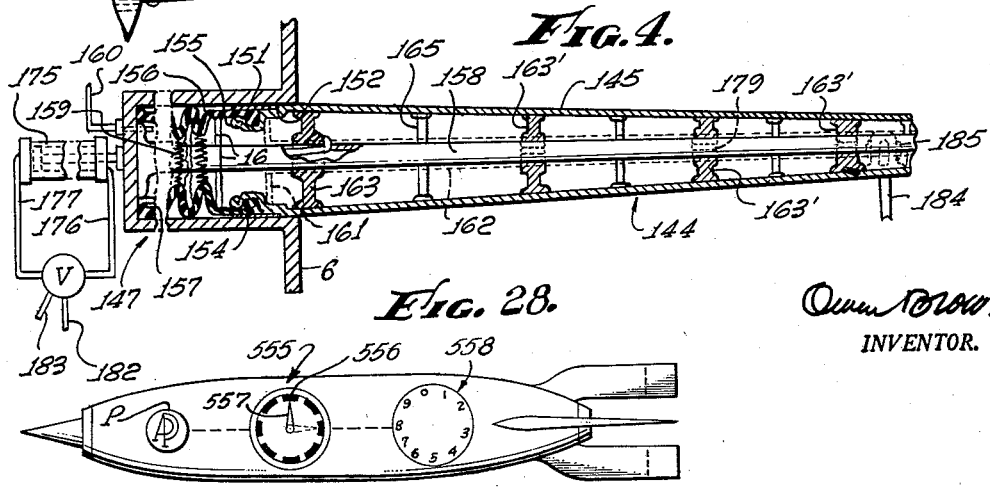

June 4, 1963 O. BROWN 3,092,355
VARIABLE-WING SUPERSONIC AIRCRAFT
Filed April 27, 1948 6 Sheets-Sheet 3
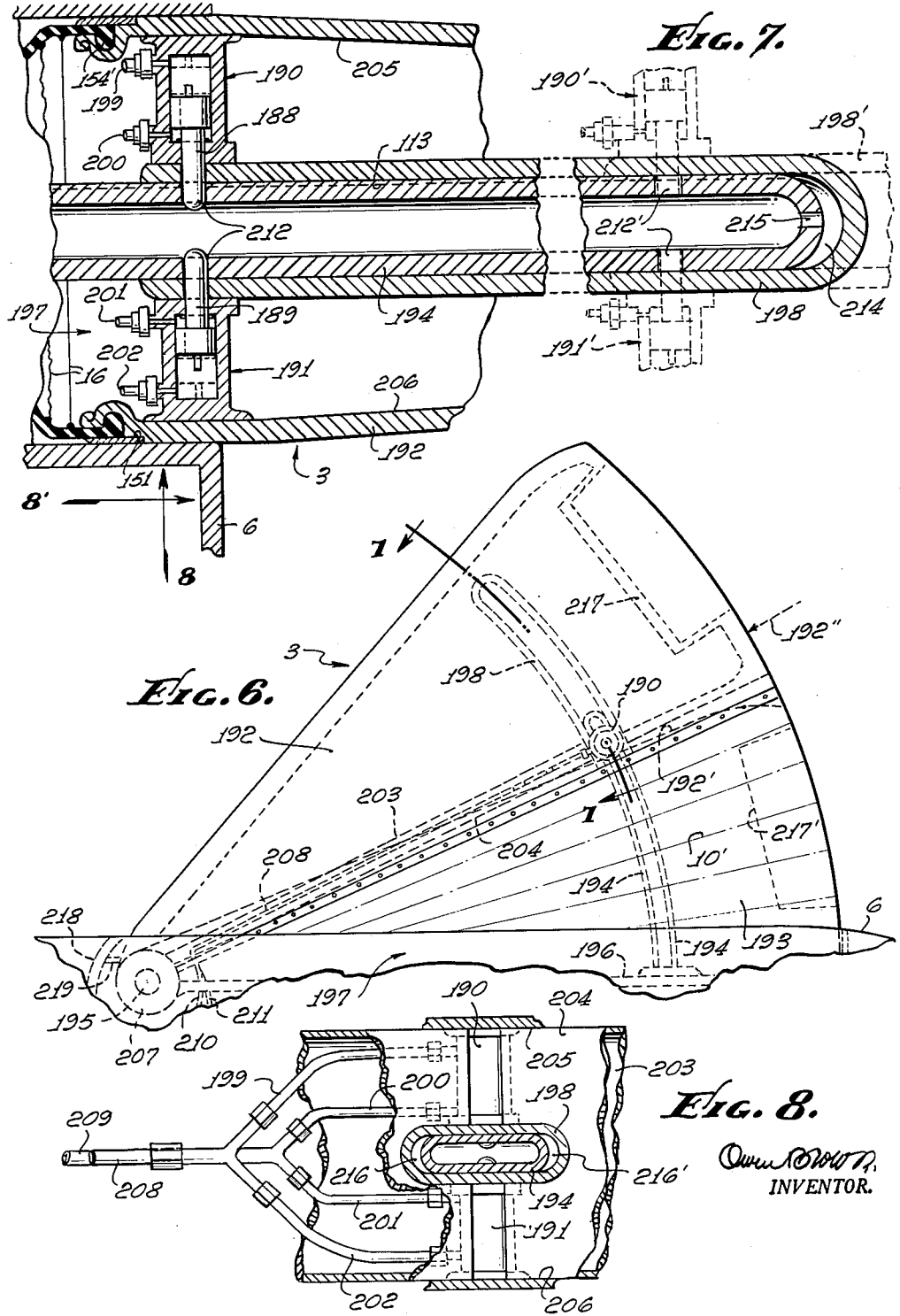

June 4, 1963 O. BROWN 3,092,355
VARIABLE-WING SUPERSONIC AIRCRAFT
Filed April 27, 1948 6 Sheets-Sheet 4
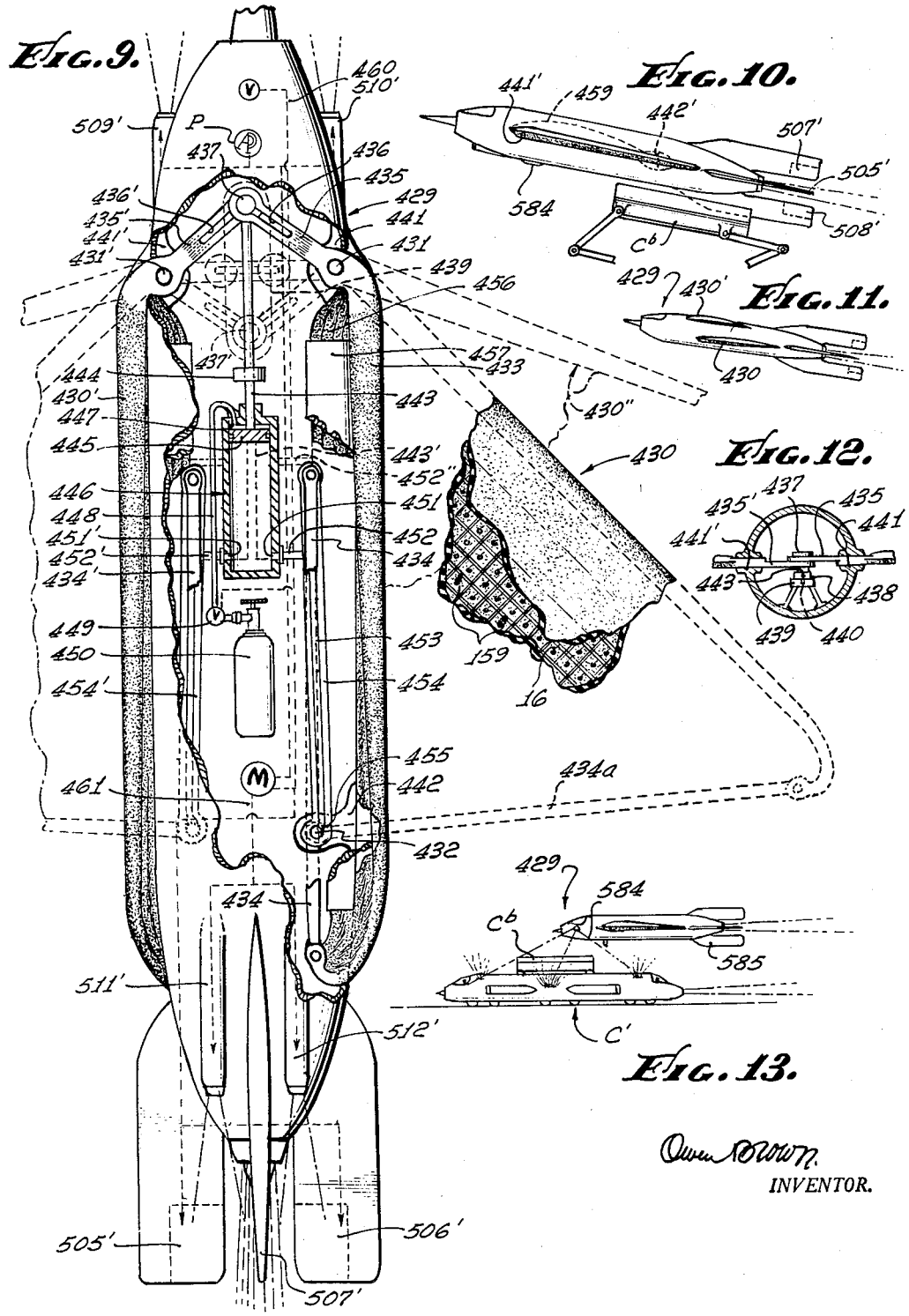
INVENTOR.

June 4, 1963 O. BROWN 3,092,355
VARIABLE-WING SUPERSONIC AIRCRAFT
Filed April 27, 1948 6 Sheets-Sheet 5
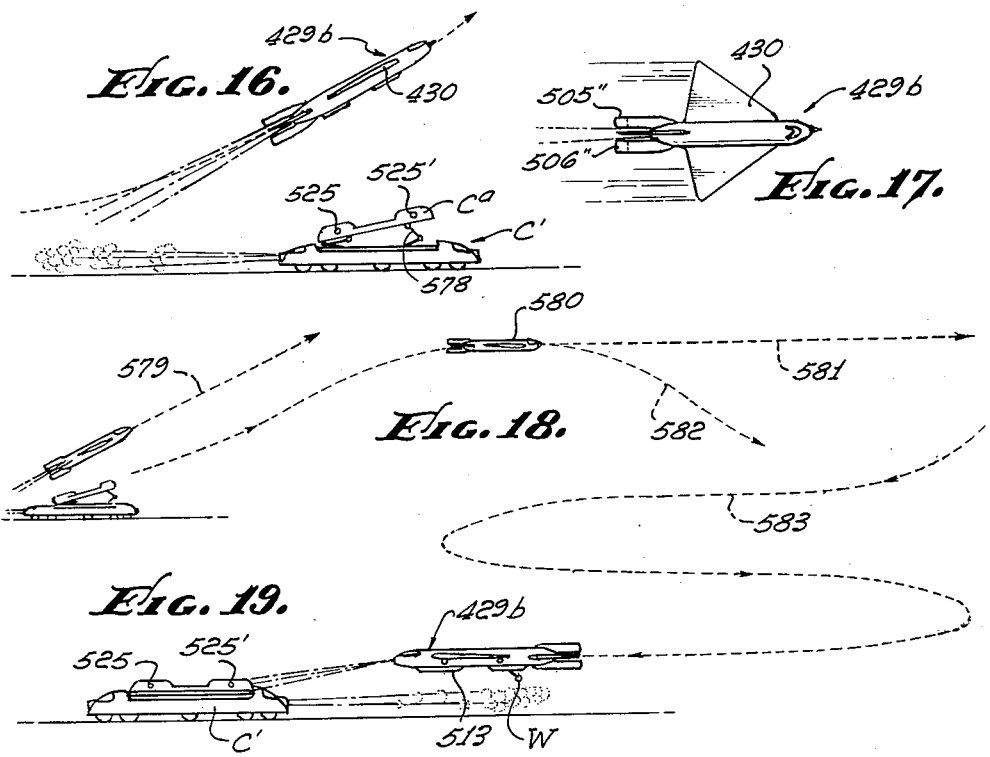
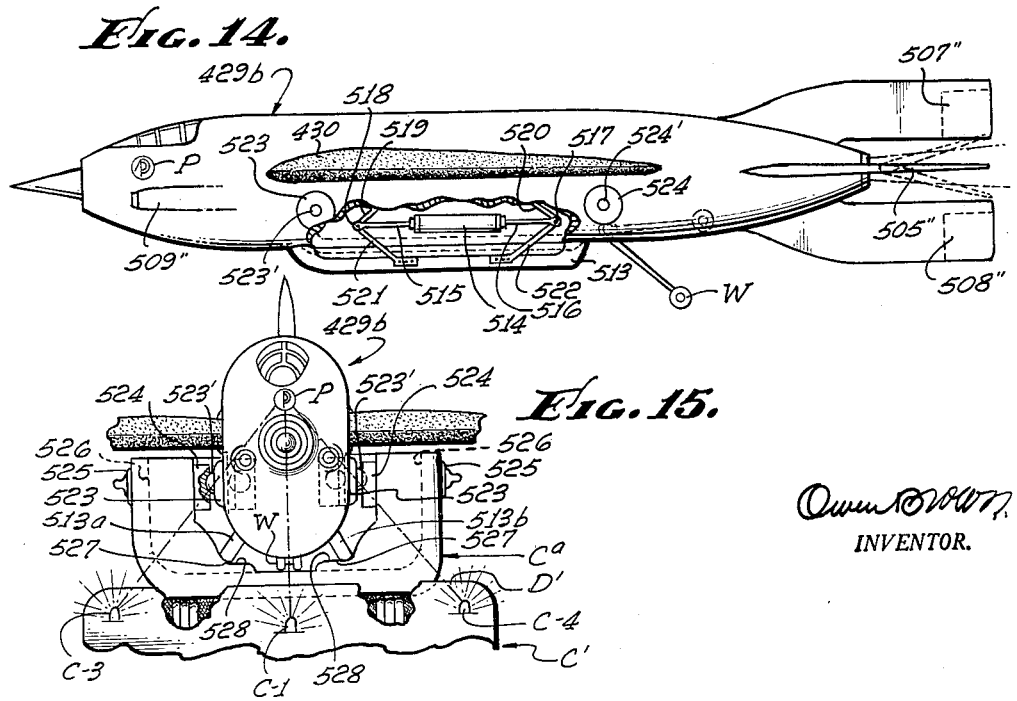
Owen Brown
INVENTOR.

June 4, 1963   O. BROWN   3,092,355
VARIABLE-WING SUPERSONIC AIRCRAFT
Filed April 27, 1948   6 Sheets-Sheet 6

Owen Brown,
INVENTOR.

United States Patent Office 3,092,355
Patented June 4, 1963

3,092,355
VARIABLE-WING SUPERSONIC AIRCRAFT
Owen Brown, 5013 Exposition Blvd.,
Los Angeles 16, Calif.
Filed Apr. 27, 1948, Ser. No. 23,642
9 Claims. (Cl. 244—43)

My invention deals with ultra high-speed aircraft of a new and improved type. It also deals with certain auxiliary apparatus required in carrying out operating techniques peculiar to such craft.

Thus, with the aid of said auxiliary apparatus, my high speed devices are enabled to perform in a superior manner without having to be encumbered with unnecessarily heavy, more bulky airfoils and landing gear, as employed on existing airplanes operating at lower air speeds and landing and decelerating at relatively low to moderately high ground speeds.

It is, therefore, the major object of the invention to provide a greatly improved type of aircraft, especially wherein the same is to be employed in ultra high-speed ranges.

Another important object is to provide such craft which can be readily launched and landed without attendant wreckage of the same and disaster to its occupants—or to its cargo pay load if carried thereon.

In accord with the preceding objectives, it is another object to provide airfoils of a particularly practicable kind, which may be fully extended for take-offs and landings but partially retracted—and thereby rendered substantially lighter and stronger—at certain relatively high speeds in atmosphere when fully extended airfoils would be unnecessary, and would merely constitute an unrequired excess of weight and aerodynamic drag.

Sundry other objects will be made clear during a perusal of the descriptive data and the appendant claims, as complemented by the drawings, in which—

FIG. 1 is the side elevation of a supersonic aircraft of one preferred type, as viewed in flight.

FIG. 1ª is a frontal view of the FIG. 1 craft.

FIG. 3 is the fragmental, partially schematic representation—viewed from above—of a two-phase simplified folding wing, which may be employed on the aircraft of FIGS. 1 and 2. The largely schematic arrangement features (1) a collapsibly inflatable inner wing segment and (2) a non-collapsible outer wing segment.

FIG. 3ª indicates an optional modification of the wing structure of FIG. 3 and is a fragmental elevation which could be taken at the arcuate segment of line 3ª—3ª.

FIG. 4 is a largely sectional, fully broken open elevation of certain major operative components of the wing of FIG. 3, and may be taken as a view to the rear of any one of the arcuately formed phantom wing-horns—to be hereafter clarified—as, for example, through either of elements 158 above and below the line 4—4, but *only when the wing is in its fully folded position*, as will also be explained hereinafter.

FIG. 5 is a largely broken open detail of a wing-horn and other wing components seen in FIG. 4, taken at the same angle of view, and featuring optional means for locking and bracing said wing in both its fully extended and partially retracted positions.

FIG. 6 is the side elevation of a two-phase dorsal fin comparable structurally to the wing of FIG. 3 and typical also of other subsidiary airfoils which may be employed.

FIG. 7 is a largely broken away sectional detail—taken arcuately along the line 7—7 of FIG. 6, but only when said fin is in its retracted position, to be clarified later—more particularly, however, of the subsidiary pneumatic control system for latching and unlatching the rigid component of said dorsal fin for partially retracted and fully extended relations.

FIG. 8 is a fragmental detail of the FIG. 6 airfoil, but taken approximately along the line 8 of FIG. 7, as viewed looking in the direction of line 8'. The view further features the subsidiary latch control system of FIG. 7.

Figure 1:
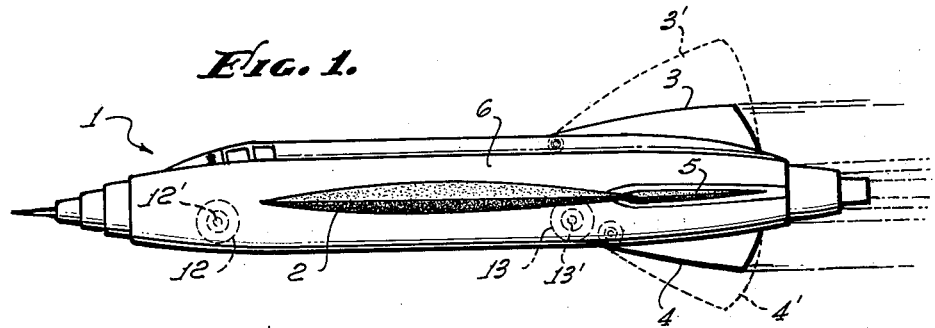
Figure 1A:
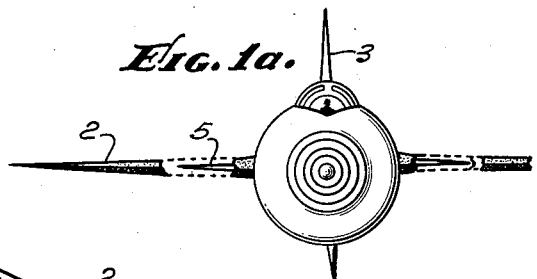
Figure 2:
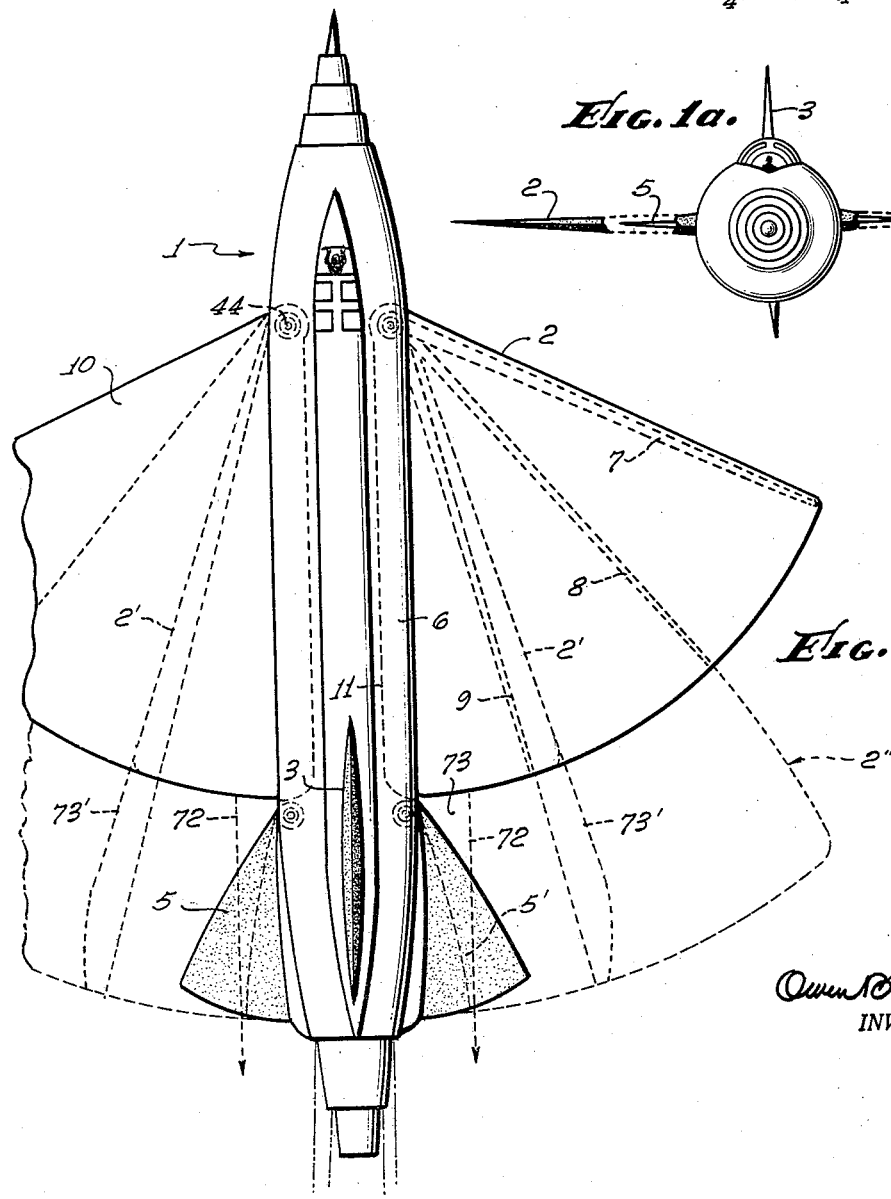
FIG. 2 shows the aircraft of FIG. 1 as seen from above.

FIG. 9 is a broken open view from above of another high-speed aircraft, comparable to the airplane of FIGS. 1 and 2.

FIG. 10, in side elevation, briefly illustrates one means for launching the aircraft of FIG. 9, but with suitable modifications, applicable also to the aircraft of FIGS. 1 and 2.

FIG. 11 is another operational view of the aircraft of FIG. 10 as modified.

FIG. 12 is a fragmental, partially sectional view from the rear of mechanism for operating the folding wings of the airplane of FIG. 9.

FIG. 13 is side-elevational and shows the FIG. 9 aircraft preparing to make a cradle landing on a so-called ground car, as hereafter explained.

FIG. 14 is side-elevational, and is partially broken open to illustrate optional landing gear applicable, for example, to either of the high-speed aircraft previously mentioned.

FIG. 15 is further illustrative of the optional landing gear shown in FIG. 14, wherein the aircraft therein has made a so-called cradle landing on the ground car fragmentally indicated. The view is a front elevation.

FIG. 16, in side elevation, illustrates an optional launching technique as hereafter explained.

FIG. 17 is a flight view from above of the aircraft of FIG. 14, for example.

FIG. 18 is a schematic view illustrating certain flight techniques to be explained.

FIG. 19, in side elevation, illustrates the preliminary technique of a cradle landing on the ground car there shown.

FIGS. 20 to 27 are largely schematic and diagrammatic, featuring robot-control instrumentalities—such as the mercury switch device shown therein—which are applicable to either of the aircraft mentioned heretofore; that is, if operated by automatic pilot controls in the manner explained.

And FIG. 28, in side elevation, is a schematic representation of a time-operated flight control means to be explained.

Unless indicated otherwise, the various numerals and characters of the drawings represent substantially identical parts.

Structural Characteristics

One embodiment of my invention is depicted generally in FIGS. 1, 1ª and 2. Aircraft 1 of FIG. 1 is shown in a high-speed horizontal flight position, wherein its airfoils—such as a duality of wings 2, upper and lower vertical stabilizers 3 and 4, and a right and left pair of horizontal stabilizer 5—are partially retracted within coverts or pockets therefor to be detailed hereafter.

As indicated by phantoms 3' and 4', the upper and lower fins or stabilizers 3 and 4 may be extended outwardly much further than shown by the solid lines of the drawing; and in normal operations these phantom locations would be their positions at takeoff and again during the periods incidental to landings. Moreover, as seen in FIG. 2, the wings 2 may occupy extended positions for landings and take-offs; and they may, in high-speed flight, be at least partially retracted by one or more stages according to the speed of the aircraft, the density of the air at the altitude where flown and other factors.

Thus, also as indicated by right and left phantoms 2', the already swept-back wings may be folded inwardly toward the fuselage 6 whereby the aircraft 1 presents a dart-like appearance: this folding action being comparable to the similar operation of the wings of certain birds of the hawk and eagle species when executing swift dives from aloft upon their prey. As these naturally endowed creatures are thus enabled to greatly minimize aerodynamic drag, so can craft 1 accomplish a like objective at those times when its fully extended wings not only are not needed but would, if extended, have a decelerative effect and greatly aggravate the effect of shock waves in transonic and supersonic air.

The wings 2 of FIG. 2 are conveniently indicated to have three stages of extension and retraction, conformable to the respective wing booms 7, 8 and 9, but as these particular components relate to a modification which is not claimed in the present specification, attention is now directed to the aircraft of FIGS. 1, 1ᵃ, and 2 with express reference to airfoil types shown in FIGS. 3 to 8.

For the retraction and extension of the wings 2, or the fins, 3 and 4, variable means may be provided. It may be emphasized incidentally, that such airfoils need never retract entirely into the fuselage, even on the fastest supersonic craft; and for that reason the structural form exemplified by each and all of FIGS. 3 to 8 is especially favored, having a retractable inner segment and a partially non-retracting—that is, fully outboard—segment.

Thus, as also in the case of the wings 2, and to reiterate somewhat, it will be assumed that upper and lower fins 3 and 4, FIG. 1, need not at any time retract beyond the positions shown, while in the lower speed ranges they can be extended to positions 3' and 4'. Clearly, in the high-speed, extremely swept-back positions, fins 3 and 4 will present no problem in compressibility. In airplanes of existing type, however, the structure and placement of the horizontal fins assumes a major role. Because of the difficulty which was encountered from shock waves, set up by the wings of an aircraft, colliding with the horizontal fins, the latter were re-positioned quite high on the right and left sides of the vertical stabilizer. The obvious objective was to provide an area of complete clearance between the respective wing and fin components, whereby each thereof encountered the upstream air simultaneously without interference. But it should be obvious that this expedient is but a comprise and not a complete elimination of the difficulty, and that such an arrangement could, in an aircraft going slightly out of control, merely aggravate its troubles by reason of the duality of compressibility components, instead of only one, to be combatted.

In aircraft 1, the problem is overcome in a different and improved manner. It is believed, for example—and contrary to the prevalent theory and practice, as well exemplified by the leading high-speed British and domestic airplanes—*that the wings and the horizontal stabilizers should be on exactly the same plane*, but so closely spaced that the boundary air from the wings will have a practically uninterrupted flow thence over the fins therebehind. The net effect in short, is to obtain an aerodynamic unity therebetween, so for as possible, comparable to that afforded by the fins, only, of a wingless V–2 type of rocket.

Co-Aligned Airfoils

Such an effect is illustrated in FIG. 2. If, for example, the wings 2 are retracted to the full swept-back, supersonic positions 2', it is obvious that the compressibility problem would be reduced to an extent approximating the hypothetical minimum. Furthermore, the horizontal fins 5 would also retract to the similar swept-back positions 5', just inside the right and left dotted lines 72. Only the relatively small right and left areas 73, then, would remain between the wings and the fins to create or aggravate possible secondary compressibility and resultant shock-waves impinging against fins 5. And it should be equally apparent that the latter will be so swept back, and so closely nested within the upper and lower boundary currents flowing rearwardly off the larger and thicker airfoils, that little or no difficulty should be experienced from this source.

In short, instead of both the wings and the fins 5 encountering full compressibility simultaneously, *but separately*, as on existing airplanes, the fins 5 will be able largely to move within the single, undivided slipstream of the wings as aforesaid. See, for instance, the positions of right and left fins 5, relative to wings 2 in FIG. 1ᵃ. (Obviously, in their respective supersonic positions, both fins 5 and wings 2 would be considerably more abbreviated.) Moreover, the drawing is by no means intended to be the last word in design, and skilled specialists will doubtless achieve a more profound arrangement than here generally shown.

However, I provide a yet further extension of the idea of unified front and rear airfoils. Thus in the aircraft 1 of FIG. 2, the wings 2 may extend sufficiently far to the rear to also occupy the position previously reserved for fins 5. That is: according to the phantom 2''.

Such a wing would be still further swept back in its fully extended position, without essential sacrifice of airworthiness for landing and launching purposes, and it is obvious that the ailerons could also be then utilized as elevators. When retracted to full supersonic positions, according to right and left phantoms 73' and 73', for example, it is evident that either aileron or elevator effect may be obtained optionally, according to be necessary elective operation of the controls.

Needless to say, such airfoils, incorporating the control features of both ailerons and elevators, afford a desirable maximum of penetrative effect upon the airstream with a minimum of possible aerodynamic drag or buffeting. The aircraft as a whole presents something of the appearance of an arrowhead or dart—or of a V2 rocket wherein a duality of the fins thereof might, hypothetically, be extended forwardly to substantially the greater length of the rocket casing and formed as wings for horizontal sustentation.

It is believed that such composite airfoils are one satisfactory solution to the problem of compressibility, insofar as the latter has to do with airfoils per se. These, however, will now be more fully explained. But, in this relative to said FIGS. 3 to 8.

Bi-Functional, Semi-Retractive Wings

As already explained with respect to wings 2 or 2'', the wing 144 of FIG. 3 has at least one collapsible and one, at least, normally non-collapsible segment thereof. Only the collapsible segment, however, is normally necessarily inflatable in the manner hereafter proposed.

Therefore, for a convenient illustration, wing 144 of the drawing is indicated to comprise an outer rigid, non-collapsible segment 145 integrally joined to an inner collapsible segment 146; only the latter being adapted, in one position, to be received well within the inboard wing pocket generally depicted by the numeral 147 and extending longitudinally as far aft as necessary from the proximity of the shoulder 148.

The phantom 145' shows the approximate position of wing segment 145 when the aircraft is moving at ultra high speeds.

The rigid segment 145 may be of any preferred exterior and interior design and structure consistent with the features described herein. Nor do I wish to limit the structural material therefor to metal, since a non-metallic plastic substance, for example, may be found having equally desirable or possibly superior characteristics for particular service demands. It is, in short conceivable that wing segment 145 could have a shell or casing of superhardened plastic material reinforced with metal, and said casing could be produced in the form of a sandwich. Again, the casing could be of a rubbery character—hence relatively impervious to the abradant action of hailstones, rain drops, and the like—stretched tautly across a suitably reinforced frame of rigid structural elements; and according to the latter option, segment 145 could be independently filled with a lighter-than-air type of gas, and could have any desirable number of compartmental areas partitioned from one another.

The more orthodox construction, however, would call for the use of a selected metal or metals.

According to FIG. 3, wing 144 is conveniently assumed to be of a more than usually swept back type, as explained with respect to wing 2′. Segment 145 has the sturdy shoulder 148, as aforesaid, and extends lengthwise from the area of king pin 149 to area 150, which latter may be relatively close to the rear end of fuselage 6. In short it may, by option, be employed in the manner of wing 2′. As more graphically seen in the sectional view of FIG. 4, taken through one of the aforesaid horns of FIG. 3 above and below the line 4—4 of FIG. 3, the flexible segment 146 (of the latter view) is here conveniently made integral with segment 145 by means of upper and lower elongate cleats 151—see also FIGS. 3 and 7—which abut at skin level against the longitudinal shoulders or ridges formed by the suitably configured casing at upper and lower areas 152. In the event that the non-collapsible segment 145 should be covered with a rubbery casing wall, it is obvious that the skin component of both wing segments could be one continuous member. Cleats 151 are here indicated to be secured to said casing by screws, rivets or the like 153, FIG. 3.

The casing proper of segment 145, in this version, has been formed adjacent its inwardly disposed edges with upper and lower longitudinal grooves, within which the upper and lower beaded edges 154 of the flexible casing of segment 146 are tightly snugged in the manner indicated; the rigid casing of segment 145 terminating at the rolled beadlines 155, which latter, in conjunction with cleats 151, maintain the bead elements of segment 146 securely locked but relatively accessible at any time that segment 146 may have to be replaced or in order to afford access into the interior of segment 145 for possible repairs or replacements of parts.

Segment 146 has been described as comprising a "casing," but actually, in the drawing, said segment is shown as including both upper and lower flexible casing wall members 156, which members may be of a rubbery character with suitable fabric reinforcements or as otherwise expertly determined. Members 156 are also preferably anchored in an airtight manner at the location of upper and lower inner beads 157. For this purpose, snugging elements similar to those which were described in connection with the cleats 151 may be employed.

In order to maintain the wing segment 146 in its correct aerodynamic configuration when fully extended, suitable means interconnecting the upper and lower wall members 156 are here provided in the form of a multiplicity of stress-lines 16. These stress-lines, which are strongly anchored to the upper and lower members 156 on their inner sides, need not conflict in any way with the series of horns 158 (to be detailed shortly), since they will be spaced therebetween.

Other Structural Details

Anchored also to the inner sides of upper and lower members 156 are a predetermined plurality of coil springs 159. These springs are normally arranged in rows in such manner as to facilitate the bellowswise folding action of the members 156 when deflated; that is, so as to fold to the configuration approximately as indicated briefly in FIG. 4. Of course, when segment 146 is fully inflated, the springs 159 will yield as required. The duality of irregular lines between the two spring elements here shown represent stress-wires or the like 16, in their relaxed positions.

At this point attention is directed to the detail of FIG. 3ª, which shows how, by option, the flexible segment 146 may be provided with still other means for maintaining its correct position aerodynamically when inflated, as well as with a form of additional reinforcement therefor and a means, co-active with coils 159, to facilitate the folding action of the flexible casing elements 156.

In brief, with reference to both FIGS. 3 and 3ª, it is apparent that, at the shoulder area of the outwardly disposed rigid wing segment 145, the latter could be formed inwardly of its leading edge portion 145ª (as in FIG. 3ª) whereby to include a so-called shoulder socket within which any desirable plurality of radially extending ribs 145ᵇ, 145ᶜ, et cetera, could be also carried from the king pin 149.

These ribs may have their own respective shoulders, approximately as shown; but at a predetermined distance radially from pin 149 they could be narrowed to a formation, as in FIG. 3, where each of the same comprises little more than thin flat vanes—comparable to those in ladies' fans but arranged for side-by-side contiguity when folded.

Obviously, the areas at which the upper and lower casings 156 are secured thereto could begin at any required locations, away from the respective shoulders, so as not to interfere with the said desired bellows-wise folding of segment 146. It is apparent that a lesser number of coils 159 would be required, and the latter suitably arranged intermediary of the ribs.

All desired features of FIG. 3ª, clearly, could be applied to the comparable airfoil of FIG. 6.

Since the upright inner wall 147′ (FIG. 5) of wing pocket 147 is an airtight member, it is obvious that when pressurized air or the like is introduced thereinto through the line 160 of FIG. 4 (the latter leading to any suitable source therefor, as may be readily determined by skilled specialists of the related art), said air or the like cannot escape, unless otherwise optionally provided, except back through line 160 upon the operation of suitable valve means for both inflation and deflation of segment 146.

However, it is optional as to whether the air chamber is to extend into the rigid segment 145, and it is likely that, for a plurality of obvious reasons, it will be desirable to confine the pressurized fluid—both on military and civilian types—to segment 146 proper. Thus, in FIG. 4, the upright phantom 161 indicates an airtight wall member extending between the upper and lower casing walls of segment 145. And branching therefrom are a series of suitably formed sleeves 162, into which sleeves the arcuate horns 158 are received and relative to which they may have limited slidable movement. One such sleeve 162 is indicated at phantom 162′ in the plan view of FIG. 3.

To be sure, the sleeves 162 could extend laterally to the right from the innermost of the web members 163, assuming the latter to be continuously interconnected, as best seen in FIG. 5; said particular webs being the farthest to the left of a series thereof including webs 163′—approximately as suggested—and having openings through which the stationary horns 158 protrude, as in FIG. 4, when wing 144 is normally folded. And when wing 144 is fully extended, as in FIG. 3, the plurality of inner webs 163 naturally move outward simultaneously to the positions at which their further movement is prevented by one or more latches 164 (FIG. 5) associated with one or more of the horns 158.

However, a plurality of these latches, while optional, may not be required; and in practical operation a latch 164, operable in connection with the lowermost of the webs 163a—s viewed in FIG. 3—may be quite sufficient on each of a pair of the wings 144. All of the webs 163, including webs 163′, are made integral with the upper and lower inner walls of wing segment 145, thereby serving as reinforcing struts therefor; and any desired arrangement of other struts, ribs, torsion braces, spars, et cetera—as but generally indicated by elements 165 of FIG. 4—may be further provided according to whichever type of standard wing construction, or composite thereof, is deemed most satisfactory for the indicated demands.

In the FIG. 5 view the inner complementary latch 164' is carried from pivot 165a and is adapted, in one position, to lock against the outward side of the inner web 163: thus positively preventing outward movement of wing segment 145 until elected. That is, the latch 164' is continually urged to the locking position as shown by the compression spring 169; but upon operation of cylinder 175 and lock-rod 168 for inward movement, the pawl element 166 is cammed to the left by half-collar 167, latch 164' is thus automatically withdrawn from the locking position shown, and inner web 163 is thereby permitted to swing to the right along with the remainder of wing segment 145.

According to this optional arrangement, the pawl 166 is desirably formed as a fork and the latter is presumed to straddle both sides of the lock-rod 168. Alternatively, and perhaps preferably, the spring 169 could be eliminated and a duality of suitably spaced half-collars 167 provided at right and left of pawl 166 for positive push-pull action thereagainst, according to whichever direction the rod 169 is moved by cylinder 175. In the drawing, however, the normal arrangement would be to provide a duality of the springs 169 appendant from bracket 170 and pawl 166 on both sides of the lock-rod. According to still a further option, the latch 164' could be operable in its upper locking position by a simple torsion spring (not specially shown) comparable to spring 171 of the outwardly disposed latch 164—to be further detailed shortly—and the actuating means of the latter device, too, could be replaced by one of the actuators defined in respect to latch 164'.

Lock-rod 168 has only brief limited slidable movement within the hollow interior of horn 158; and in order to provide for a more simplified assembly of the respective elements, such slidable movement is afforded by one or more collars 172, including an end-collar 173 at the end of the lock-rod; it being a simple matter to merely introduce such lock-rods into the open ends of the horns at the time of the initial assembly. Rod 168 is slidable through stuffing box 174 upon actuation for inward or outward movement from pressure cylinder 175; and it is apparent that where pressurized fluid enters cylinder 175 through line 176, the lock-rod will be driven to the left (in the drawing) whereby to lower latch 164' as the result of the aforesaid camming action of half-collar 167 against pawl 166.

When, however, the fluid enters cylinder 175 through line 177, FIG. 4, the lock-rod 169 will be driven to the right, the resultant withdrawal of half-collar 167 enabling compression spring (or springs) 169 to automatically return latch 164 to its locking position as aforesaid against inner web 163. Clearly, it is also desirable to positively limit the outward swing of segment 145 in its extended position, as was earlier intimated, and to secure same against non-elected inward movement; and these relationships are effected by means of (*a*) the stop-pin 178, FIG. 5, adjacent the tip end of the horn and (*b*) the aforesaid latch 164.

Latch 164 is conveniently actuated by torsion spring (or springs) 171 tending to force it upward through a slot complementary thereto in the wall of horn 169, whereby to become locked against the *left* side of inner web 163 in the latter's outward location. Obviously, further outward travel having already been prevented by pin 178, the inner web 163 will be maintained against either inward or outward movement until actuation of cylinder 175 in reverse; which same includes the leftward movement of the half-collar 167' against pawl 166' to release latch 164.

It is understood, incidentally, that phantom 163" of FIG. 5 is none other than the same inner web 163 earlier mentioned but now occupying a different location with respect to the stationary horn 158—having merely moved, as explained, to this outermost position until intercepted by pin 178. (Parenthetically, it is obvious that the horns could, but less desirably, be rigidly carried from segment 145 and adapted to be slidably received within suitable sleeves therefor leading inboard into the main aircraft body.)

Pin 178 preferably projects through both sides of the horn at the location shown. And in order that this stop member may not interfere with the outward travel of the *remainder* of the webs 163', the latter, only, are formed with the slotted grooves 179 of FIG. 4; thus affording free passage of the more outwardly disposed webs over said stop-pins until the innermost web 163, having no such slots therein, is contacted and stopped at said fully extended position of the wing. A like action takes place in reverse when latch 164 is actuated to release segment 145 for inward movement.

Phantom 144' indicates a brief fragmental leading edge portion of wing 144 in its closed position, relaitve to the location of the tip-end of one of the stationary horns 158. But when wing 144 is fully extended, the tip-ends of the respective horns will appear approximately as seen in FIG. 3, the rigid outer wing segment having moved to the location at which each of the innermost webs 163 will have been intercepted by the respective pins 178 as aforesaid and thence additionally locked against non-elected reverse movement by latches 164. See also the brief phantom indication 164a of the latch or latches 164 in said same FIG. 5.

FIG. 5 is not to be considered as drawn to a predetermined exact scale; and it is apparent that, in practice, the distance between end-collar 173 and half-collar 167' may be greater than indicated. Thus, too, while horns 158 are shown as being tapered considerably, it may be found that the same should be of uniform outer diameters, so as to afford only direct slidable engagements with the sleeves 162—for greater rigidity in the closed, high speed position—instead of permitting a wide tolerance between some of the webs and the more outwardly disposed portions of the horns. These, however, are minor details which may readily be determined in an orthodox manner by the eventual designers.

Webs 163, while but briefly indicated in FIG. 3 as individual uprights, may be of interconnecting construction, and necessarily so if the same are to be utilized in lieu of air-sealing wall 161 of FIG. 4. The dotted line phantom 181 indicates an aileron of any preferred type, the same being also operable in lieu of a right hand elevator in the fully conformed wing of the drawing.

The function and structure of distributor valve V of FIG. 4 will be elementary to skilled designers; this schematic arrangement merely indicating the obvious means whereby to control the metering of pressurized fluid into and out of wing 2. That is, in FIG. 4, line 182 is the input and line 183 the escape to atmosphere. It may be desirable to fully coordinate the operations of the cylinder (or cylinders) 175, including valve V of FIG. 4, with the pressure system which also controls the pressurization and deflection of wing segment 146 through line 160; in which event such a further detail will lie within the ready determinations and skills of straightforward engineering, and need not be unnecessarily schematized or detailed herein. See, however, the pneumatic system on the aircraft of FIG. 9.

The series of arcuate phantom lines 180' indicate optional transverse flexible webs within the main casing structure of segment 146 which could, by option, afford separately inflatable chambers therewithin.

*Airsealing Options*

As the foregoing structure does not yet afford an airtight seal between segments 145 and 146—owing to the fact that the pressurized fluid entering the latter through line 160 could escape through slotted areas of both the horn or horns 158 and sleeves 162, contiguous the latches 164 and 164'—positively airsealing is provided in the form of outer sleeves 180, as briefly indicated in the phantom adjacent inner sleeve 162 at position 162', FIG. 3. If the latches 164 and 164' are provided on a plurality of the horns 158, a like plurality of sleeves 180 may be employed. But if such latches on only the lowermost of the horns, for example, as seen in FIG. 3, are considered adequate, then any additional number of the outer sleeves 180 can perhaps be omitted.

Thus a sleeve 180 would not seem to be required at the location shown, where it has been placed more conveniently in view of the somewhat complicated detail in the wing area opposite the lowest of horns 158.

It is understood, of course, that sleeve 180 need only be of a diameter sufficient to afford adequate clearance for latches 164 and 164'. Such an airtight structure not only will greatly reduce the quantity of pressurized fluid required for inflation of wing 144 but will obviate the possibility of punctures in segment 145, caused by machine gun bullets striking the latter *in its supersonic position*, from rendering the wing inoperative later in its extended position. See also references hereafter to FIGS. 6, 7 and 8, giving at least another means for air-sealing segment 145.

It is sufficiently clear, by now, that upon operation of the necessary controls, the wing segment 145 may be forced fully outward, in the lower speed ranges, by merely admitting fluid under sufficient pressure into segment 146 while coincidentally actuating the cylinder or cylinders 175 to release this outermost segment. Wing 144, however, may also be geared to any suitable other means for positively controlling both its flexes and reflexes from the area of shoulder 148 and king-pin 149, for example.

Phantom 184 of FIG. 3 (see also FIG. 4) represents a wing skid which is conveniently extendable and retractable at pivot 185, by any suitable means therefor, to and from a form-fitting groove along the underside of segment 145 as approximately indicated. The same is otherwise self-explanatory, as in the case of optional main landing wheel 186; the latter being made possible by the rigid, non-deformable construction of the outer wing segment. Phantom 147" indicates, very generally, the forward termination of the wall 147' (FIG. 5) of the wing pocket 147, having the flexible air-sealing strip 187 interconnecting it to wing 144 in the vicinity of shoulder 148. Numeral 145" represents the approximate innermost portion of segment 145 when retracted.

While these discussions are primarily directed to airfoils which may be at least partially inflated and deflated, it should be understood that this form of presentation has been chosen for its obvious advantages. It is believed, in short, that these advantages outweigh those which could be provided—to cite a contrary example—by an air-foil similar to wing 144 in substantially all other respects but having, instead of inflatable-deflatable segment 146, a foldable but non-pneumatically operable inner wing structure which while not shown herein, in view of the multiplicity of options available in the prior art, would now be only a matter of elementary engineering after the benefit derivable from the present disclosure. Among the prior art structures so broadly characterized may be cited Brown et al. Patent 1,427,257 and Dillingham Patent 1,546,553 (but lacking, to be sure, my dual purpose wing structure).

Sundry other alternatives, whereby my two-phase or multi-phase wing structure—having at least an outwardly disposed rigid segment movable both inwardly and outwardly relative to fuselage 6—could, of course, be variously employed and equivalents substituted, if a mere avoidance of the specific structures herein were the moving consideration, but obviously at the risk of infringing one or more of the allowed claims.

*Other Extendable-Retractable Airfoils*

If craft 1 is to have additional airfoils such as fins 3, 4 and 5, these may be constructed in general accord with the air-sealing features of FIGS. 3, 4 and 5. One such subsidiary airfoil is seen in FIG. 6; and the same is assumed, for illustration, to be the dorsal fin 3 of FIGS. 1, 1ª and 2. In order to show that various alternative devices may be employed in lieu of latches 164, 164', including rod 168 and cylinder 175 as on wing 144, the fin 3 has equivalent means in the form of lock-pins 188, 189, FIG. 7, in assembly with upper and lower pressure cylinders 190, 191. (For greater clarity, the detail of FIG. 7 is shown as though viewed in the horizontal position of stabilizer 5, since the latter may be of the same construction. It is to be considered as taken arcuately through the center of sleeve 198, to be explained shortly, when telescoped over horn 194, as indicated by line 7—7 of FIG 6.)

Fin 3, in common with wing 144, is comprised of a rigid segment 192 and an inflatable and collapsible segment 193. Any required number of horns 194, similar to horns 158 of FIG. 3, may be employed but only one such element is here shown and the same may be quite adequate on small and medium size planes. Fin 3 of FIG. 6 is in its fully extended position, but when folded the rigid segment would occupy the position approximately indicated by phantom 192'. It would, therefore, be received within the outer contour of fuselage 6 to approximately the location of pointer 192". The rigid segment is pivotally mounted at king-pin 195 and the shell or casing, including the interior structure thereof, may be fabricated according to the suggestions given in relation to segment 145 of wing 144. With reference to both FIGS. 6 and 7, horn 194 is rigidly carried from the wall 196 of the fin pocket or covert generally indicated at 197, and is adapted to be received telescopically within the sleeve or scabbard 198.

As viewed in the broken away sectional detail of FIG. 8, the respective horn and sleeve elements may be flattened, in the configuration shown, according to the requirements of an exceptionally thin supersonic airfoil—especially adjacent its leading edge. Obviously sleeve 198 moves relative to horn 194 for outward and inward extension and retraction; and while not graphically shown it is understood that sleeve 198 will be suitably supported, as by struts, webs, or the like according to the comparable elements in wing 144. Phantom 198', FIG. 7, indicates fragmentally the outward location of sleeve 198, relative to horn 194, when fin 3 is fully extended.

It should be explained, incidentally, that while (except as obviously modified) FIG. 8 may be taken along line 8 of FIG. 7—viewed in the direction indicated by pointer 8'—the upper fluid lines 199, 200 and lower lines 201, 202 are preferably arranged according to the FIG. 8 detail and are only pointed to the left in FIG. 7 because of the difficulty in further breaking open the cylinders 190, 191 to show both the fluid lines and the lock-pins 188, 189 in the same view. Thus with relation severally to FIGS. 6, 7 and 8, a duality of air-sealed walls 203 and 204 extend from the respective inner casing sides 205, 206, as best seen in FIG. 8, and lengthwise of segment 192, where they become integral with the respective sides of cylinders 190, 191. Walls 203, 204 could, to be sure, merely enclose the cylinders therebetween, according to another option; and it is evident that they also form an airtight circumferential connection with and around the sleeve 198.

It is now apparent that according to the preferred arrangement of said fluid lines, they all take off from the respective cylinders on the sides thereof closest to the fin shoulder 207. In FIG. 8, the line 200 makes a fork or Y connection with line 201 while line 199 makes a similar Y connection with line 202, the resultant trunk lines 208 and 209 extending thence between air sealed walls 203 and 204 from the respective cylinders to any suitable take-off point from the segment 192 to the inboard fluid source and point of actuation, as, for example, by way of flexible tubing 210 and 211. Only the line 208 proper is seen in FIG. 6, as viewed in true side elevation, it being conveniently assumed that line 209 is directly therebehind. In practice, of course, lines 208, 209 may be clamped together by ferrules if of metal construction, or taped if of a flexible, rubbery character, and tubing 210, 211 may be unified in a similar manner. And they could be carried through shoulder 207, to mention another obvious option.

Lines 199 and 202 are operable to introduce fluid into cylinders 190, 191 whereby to drive the lock-pins 188 and 189 through the respective key-slots of the horn 194; and since said cylinders are integral with sleeve 198, such action will lock the respective horn and sleeve components in either the inward or outward position of the sleeve. Thus, in FIG. 7 segment 192 is fully retracted and sleeve 198 has telescoped over horn 194 to the position at which the lock pins are normally engaged within the respective key-slots 212.

But when lines 200 and 201 are operated to feed fluid into the opposite ends of the cylinders, pins 188, 189 will be thrust away from slots 212 to free segment 192, including sleeve 198, for extensible movement to the point at which lines 199 and 202 may again be operated to drive the lock-pins into the outwardly disposed slots 212' whereby to positively re-lock the horn and sleeve members as generally indicated by the shifted locations of the cylinders—that is, at positions 190' and 191'. Such actuation is repeated in reverse to retract segment 192 back to its folded position. Suitable stops are provided at the sides of the lock-pins, and at their ends farthest removed from horn 194, substantially as indicated, in order to limit their movements relative to the respective intakes into cylinders 190, 191.

In FIG. 7, the dotted line 113 indicates an air-groove along the upper side of horn 194, feeding to the area 214 of sleeve 198 against the possibility of a vacuum within the sleeve tending to prevent freedom of movement of the latter relative to horn 194, and the small bore 215 has a somewhat similar function in permitting escapement of air which might, under compression, interfere with the rapid inward movement of segment 192. However, since it may be normally desirable to provide a substantial tolerance between the horn and sleeve members, as in FIG. 8, the right and left air gaps 216, 216' there shown would suffice for such a purpose, while also avoiding any possibility of a bind of one of the arcuately formed members against the other.

With reference to the flexible inner fin segment 193, the respective casings having beads 154' and stress-wires 16 will be self-explanatory in view of the comparable elements of wing 144 in FIG. 4. The flexible fin casings are also adapted to fold bellows-wise into pocket 197, according to lines 10'; and to facilitate such action a suitable plurality of tension coils—see elements 159 of said FIG. 4—may also be provided. Numeral 217 indicates a rudder of desirable character, and numeral 217' its supersonic position when fin 3 is retracted. Means for remotely controlling rudder 217 are not given, as the same may be any preferred mechanism therefor selected from the available art.

Numeral 218, FIG. 6, indicates the forward termination of the airtight wall 196 defining fin pocket 197, and element 219 is comparable to the flexible airtight member 187 of wing 144. In common with wing 144, any preferred auxiliary means may be employed for retractive and extensible movements of fin 3 in addition to actuation by the superpressurization alone. The preferred pressure system therefor may be in accord with the diagrammatic arrangements given heretofore; and it is evident that the more desirable alternative would be to coordinate such a system with the master valves and other controls which relate also to wing 144. A like arrangement would be indicated for the horizontal stabilizers 5, and it is understood that the structure of FIGS. 6, 7, 8 may, according to quite obvious modifications, be utilized for the aforesaid wing 144.

Although wing 144, in common with the variable wing types described, is particularly required by the ultra high-speed airplane 1, it will be obvious that this component of the invention may be employed on other aircraft for operation primarily in the subsonic speed ranges.

*Species Variants*

FIGS. 1 to 8 are directed, in the main, to the aircraft 1 of FIGS. 1 and 2. It is felt that these views disclose an airplane of an altogether novel and important class. However, it will henceforth be possible to readily improvise variable other forms of the aircraft 1 without departing from the broader aspects of my invention. For illustration: various pressure systems differing only specifically from those heretofore given could be produced to order after the benefit to be had from the system heretofore shown. Nor are the wings 2, 2' and 144 to be regarded as other than preferred structures for the duties imposed.

In view of sundry possible modifications of the invention, certain of these will be given before describing the application of my supersonic aircraft to yet other flight controling means and to particular ground facilities which may be employed.

Referring, then, to FIG. 9, the high-speed aircraft 429 could—within the genera here disclosed—readily employ most of the auxiliary features of airplane 1. By option, however, and in common with plane 1, as suitably modified, it may be utilized solely for landings and take-offs on and from the ground car of FIG. 13, to be explained hereinafter; and in that event it need have no landing gear of presently orthodox type, and could be fitted with variably different airfoils within the general class thereof which are at least partially inflatable, for instance, and in any event adapted for extension from retracted positions to at least one flight position.

Conversely, certain features of plane 429 which afford a high degree of either local or remote control, and, hence, are especially applicable for use in robot operations, could be incorporated in the aircraft 1. In order to avoid undue complication in the drawings, however, only the major variants are graphically shown wherein they are specific to the individual species.

In FIG. 9, the aircraft wing 430 is of a particularly simplified type. And while the drawing does not graphically emphasize an airfoil expressly contoured for ultra-high speeds, it is to be understood, of course, that its primary boom component 433 may be so configured, along with the remainder of the wing. Wing 430 is carried primarily from supporting points 431 and 431'. These, then, are also the supporting points for the primary boom 433 and, in a secondary sense, auxiliary boom 434. Boom 433 does not end at pivot 431 but has the slotted crank-arm 435 within the fuselage substantially as shown. Crank-arm 435, in turn, cooperates mutually with arm 435' carried at king-pin 431', said arm 435' being integral with the opposite wing boom 430' and auxiliary boom 434'.

The respective slots 436 and 436' afford limited slidable movements relative to each other and to the wrist-pin 437. The wrist-pin, of course, serves to link arms 435 and 435' together as shown, and as also seen in the elevation of FIG. 12. FIG. 9, however, is clearer to show that both 435 and 435' are flattened downwardly on their upper sides, as compared to the configuration of arm 435 in FIG. 12 at this area. Wrist-pin 437 has the base 438 which is slidably movable longitudinally of the fuselage on the sturdy bench-plate 439, and the former having the lower spline 440 adapted to engage complementary grooving therefor in said bench-plate. Element 439, indicated by phantom only in FIG. 9, is strongly supported on a plurality of legs or their equivalent according to the drawing.

As the principal stresses which have to be borne by wing 430 will be imposed from therebelow, the foregoing structure is deemed quite adequate for the anticipated demands; particularly since the shoulder portion of boom 433, adjacent support point 431, is seen to be additionally borne slidably, rotatably on the shelf 441—complementary to shelf 441' opposite thereto—and both of these shelves co-operate with similar elements immediately thereabove, whereby to strongly maintain the wing booms in their correct positions as predetermined. Obviously the upper of the shelves cannot be included in the broken away view of FIG. 9.

Moreover, similar upper and lower trussing is provided for auxiliary boom 434, in its extended position 434$^a$, by a shelf 442; the latter being complemented by shelf 442', as best indicated generally in FIG. 10.

Base 438 of wrist-pin 437 is moved in actuation by the rod 443, FIGS. 9 and 12, which rod may be additionally supported by the stationary collar 444; and said rod, at its other extremity, terminates in the plunger 445 which is adapted to move within cylinder 446 substantially as shown. Cylinder 446, which is supported in any satisfactory manner, has the forward inlet 447 communicating with tubing 448. And tubing 448, which is adapted to be opened and closed by automatic valve 449, leads through standard connections into the high-pressure gas bottle (or bottles) 450.

It is apparent that upon actuation of valve 449 to afford escapement of superpressurized gas from bottle 450 through tube 448 and inlet 447, plunger 445 will be driven forcibly backward (downward in the drawing) to the rearward position seen at the rear end-wall of cylinder 446; thereby automatically admitting the full volume of the pressurized gas through outlets 451—451' into pipes 452—452' which communicate in any preferred manner with the inflatable portions of the respective wing structures.

It is evident, however, that before plunger 445 could be driven by the entering gas below the level of outlets 451—451', piston-rod 443 would have to travel the path of dotted line phantom 443', and, in so doing, that it would quickly pull wrist-pin 437 backward (downward in the drawing) to position 437', thereby causing wing-boom 433 and the one opposite thereto to swing outwardly to the extended positions shown.

To facilitate this action, right and left slotted members 454, 454' may be pointed somewhat further inward at the ends thereof nearest cylinder 446; but in order to present a clear outline of said cylinder, the right-hand element 454 is shown in a less desirably longitudinal relation to the fuselage. Member 454 may, of course, be strongly supported in any preferred manner. The slots 436, 436', while of unrequirable length, clearly illustrate the crisscross action of arms 435 and 435' as shown in phantom outlines midway between shoulder points 431 and 431'.

The inflatable casing portion of the wing structure may be formed to collapse into a compact, accordion-pleated assembly of folds 456 within guards 457, the exact arrangement and disposal of which elements may be readily determined by those well versed in such matters. I do not, for example, show a formal stress diagram for the wing 430—other than the fragmentary section thereof to roughly indicate a pattern of stress-lines 16 and springs 159, as were similarly depicted in FIG. 4—but technicians skilled in the production of mechanical rubber goods and rubbery materials can decide whereby the best results may be had with the view of providing the maximum strength and reinforcement of wing 430, as well as the correct aerodynamic pattern thereof, when fully extended.

Thus obvious questions as to whether the casing wall should or should not have inner tubing, or, if so, whether the same should be laminated thereto; whether the casing structure should be somewhat cellular to include partitioned off units united by valves therebetween; whether the rubbery material should be of the self-sealing description against the hazard of puncture from any likely cause, and like problems, are also left to the decisions of such skilled artisans.

It is evident, however, that the inflatable portion of wing 430 may be formed to assume the configuration of standard airfoils of any preferred type—see schematic contour line 459 of FIG. 10—when fully distended.

Schematic bottle (or bottles) 450 will be of a capacity to inflate both of the wings to any desirable rigidity. As in the case of aircraft 1, however, one or more auxiliary air compressors in conjunction with pressure tanks therefor—not shown herein—may be utilized in stand-by relation: more particularly for operations in the lower speed ranges. Noncombustible helium and $CO_2$ have obvious advantages relative to bottle 450; it having recently been reported, for instance, that tests conducted by the Consolidated Vultee Aircraft Corporation showed "only 26 pounds of helium were required to displace 180 pounds of air in the 'puncture-proof' tires of large planes."

If it is desired to admit the pressure fluid into wing 430 during an earlier phase of its extension, the pipes 452 and 452' could of course be located farther forward—as at locations 452" for instance; and a plurality of sub-inlets (not shown) could be provided to equalize the volume of the fluid upon its entry into the wing casings. For illustration, such a pattern of diffusion could be provided by introducing the pressure into the interior of boom 433 in any suitable, expertly determined manner and diffused therefrom. Suitable shut-off valve means (not shown) may be employed, or the shut-off to the respective wings permitted to occur automatically according to the pressure to be supplied from a particular bottle or bottles, which latter could be replaced as often as necessary.

*Minor Variables*

By making only such minor adjustments as will readily occur to skilled designers, it is apparent that each of the wings could be extended to position 430" if a greater wing spread is deemed necessary. And by partitioning the wing 430 into first and second successively, independently inflatable segments, results comparable to those related in reference to the two-phase wing of FIG. 3 could be obtained. Yet other options are possible.

Thus, with reference to the small view of FIG. 11, it is apparent that the craft 429 could be provided with fixed high-speed upper rudimentary wings 430' and lower, fully retractable wings 430—or vice versa—the retractable wings being employed only at lower speeds and for landings and take-offs. The staggered effect would be immaterial at the lower speeds, and all resultant drag therefrom would be entirely eliminated as soon as the same are retracted into the fuselage—or suitable wing coverts—for ultra high speed performance.

With reference briefly to the schematic control diagram of FIG. 9, it will be quite evident that the broken control-line 460, leading from the automatic pilot and parker group P, has branching contacts with all elements of the aircraft assembly necessary for automatic launchings, landings and flight control. The subsidiary control line 461 branches from motor M to components which are directly associated therewith; all such features being self-explanatory in view of the accompanying data herewithin.

Aircraft 429 is especially characterized for landings and launchings on and from a so-called "ground car," to be more fully defined hereinafter, and for certain flight duties wherein the same may, in one relation, be employed as a trajectory rocket and in another relation as a glideable aerodyne.

Skid-Type Landings

Particulars concerning certain preferred landing and launching techniques for sub-rocket 429 will be given later. In some applications, it may be found advantageous to omit landing wheels altogether and to provide, in their stead, a predetermined arrangement of skid-runners for both launchings and landings. Such an alternative structure is shown in the form of the sub-rocket 429$^b$ of FIG. 14, which is seen to be substantially the same as craft 429 except for details which relate more particularly to the undercarriage. Thus skid-runner 513 is partially or wholly retractable into the fuselage by means of the toggle mechanism including cylinder 514 operably associated with piston rods 515, 516; said rods taking off from cross-bars supported at their two ends by a duality of pivot elements at each of links 517, 518, which latter, in turn, serve to connect a duality of upper arms 519, 520 and lower arms 521, 522. (It is obvious that a complementary pair of skids may be operated from a single cylinder of the type shown.)

It is a simple matter, if desired, to extend and retract skid-runner 513 in unison with the extension and retraction of the wings: more particularly wings of the type shown in FIGS. 1, 2 and 3. Or said skid runner may be operable independently and may be provided in duality or as otherwise predetermined. In order to obtain increased stability, the runners may be positioned to point at right and left angles according to runners 513$^a$, 513$^b$ of FIG. 15.

Other launching and landing gear of rocket 429$^b$ includes, by election, pilot wheel or wheels W as well as guard-plates 523—523 which serve as universal holders for the bearing balls 523′, 523′ (FIG. 15). It is understood that elements 523, 523 are in their extended positions, and that suitable means may be provided for their extension and retraction through paneled openings therefor in the general manner disclosed in Patent No. 2,395,405, Sheet 2, to R. H. Goddard. See right and left phantoms. These features of semi-rocket 429$^b$ cooperate with the cradle C$^a$ of FIG. 15 in an obvious manner.

The bearing balls, of course, are received within sockets complementary thereto in the slightly recedable plugs 524, 524; or elements could be made slightly yieldable instead. According to the drawing, however, elements 524 are the yieldable ones and the amount of tension to be applied thereagainst, and hence against the bearing balls in their socketed positions, is adapted to be regulated at the knobs of dial plates 525, 525. Cradle C$^a$ is carried on the so-called flight deck D′ of the ground car C′ and is adapted to be raised and lowered by means of mechanism further indicated briefly in FIG. 16, to be clarified shortly. Deck D′ is swiveled to correct for cross-winds.

Cradle C$^a$ may be integral with flight deck D′ or may be mountable and demountable thereon and therefrom. In short, it may be replaced on short notice by alternative landing and launching auxiliary means, whereby to accommodate variable types of undercarriages.

As especially noted in FIGS. 16 and 19, cradle C$^a$ may be notched away between fore and aft dial plates 525, 525′, or, if the reduction of weight thus afforded is less preferable to better streamlining, it may be otherwise contoured. However, much of the weight of cradle C$^a$ may be eliminated by providing thinly dimensioned side walls as suggested at lines 526, 526 except for the sections thereof required for support of the landing and launching mechanism per se, inclusive of ramp flooring 527, 527. The latter, to be sure, may be of light-weight cellular construction and is preferably tapered exteriorly to brief flat-topped lower runways 528, 528 substantially as shown; this construction providing an auxiliary means for centering the semi-rocket 429$^b$ relative to the bed of the cradle.

Semi-rocket 429$^b$ may also have the conventional rudders 507″, 508″, FIG. 14, as well as elevators 505″, 506″ of FIGS 14 and 17. Wing 430 is presumed to be similar to the like airfoil of FIG. 9. Or it could be identical with the wings of FIGS. 2 and 3. The so-called latitudinal homes C–3 and 2–4 and the so-called longitudinal home C–1 (which may be in duality at respective front and rear ends of the ground car) will be readily understood by those versed in this branch of electronics. These electronic beacons cooperate with so-called automatic pilot and parker mechanism—see symbol P of FIGS. 14 and 15—whereby the semi-rocket may be guidably steered into accurate landing engagement with car C. But since not claimed per se in the present application, they are retained merely to indicate one possible mode of operation.

The "Phantom Pilot"

Figure 20:
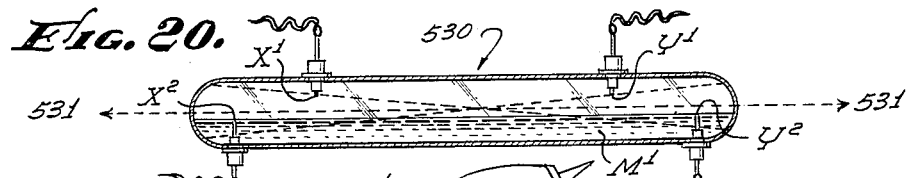

Before dealing with techniques employing the apparatus of FIGS. 16, 18 and 19, attention is called to the so-called phantom pilot of FIG. 20.

In certain of the operations which are possible with semi-rocket 429$^b$, for example, it may be desirable to navigate said craft by automatic pilot controls exclusively. According to one such method, the aircraft is operated at one or more stages of its flight as a trajectory rocket, but at another stage or stages as a glideable aerodyne. It is desirable, in short, that at a particular predetermined altitude—or after the elapse of a predetermined interval of time—the semi-rocket 429$^b$ shall no longer ascend rocketwise but shall assume a glidable attitude automatically and continue thence in horizontal flight for a substantial further duration.

The aforesaid phantom pilot device (for at least aiding to carry out such operations) consists of the mercury tube contrivance 530. Tube 530 may be of any suitable construction, but is here assumed to be constructed from super-hardened quartz crystal, such as developed by Corning Glass Co., or other suitable hard or tempered glass or its equivalent. The contact elements X$^1$, X$^2$ and Y$^1$, Y$^2$—may be of the conventional sealed-in-glass type substantially as shown. Thus electrodes X$^1$ and X$^2$ are positioned approximately as indicated whereby, when tube 530 is level to the line 531—531, and the mercury M$^1$ is also level, points X$^1$ and Y$^1$ will both ride well above the level of the mercury.

Figure 21:
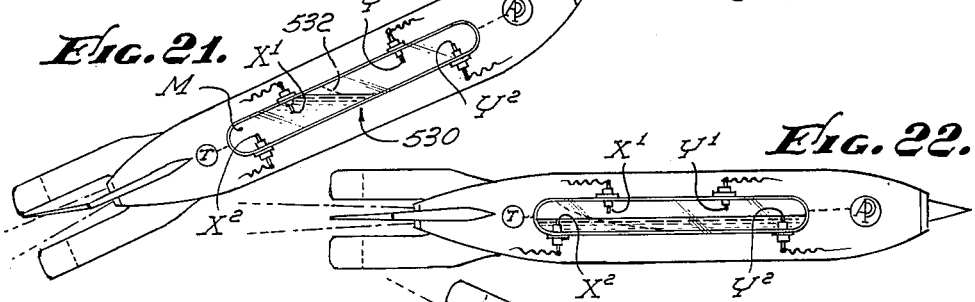

Since complementary points X$^2$ and Y$^2$, while simultaneously immersed in the drawing, have no contacts with their complementary members, tube 530 is there seen to be at neutral. But if said tube, in FIG. 21, is tilted at the flight attitude there shown, the mercury would retract to the rear end of the tube, covering both points X$^1$ and X$^2$ and producing instantaneous electromagnetic actuation of flight control apparatus (not shown) through an auxiliary mercoid switch (not shown but commonly known in related arts), as will be more fully explained later.

At ultra high accelerating speeds, the mercury will doubtless tend to climb upward as indicated by broken line 532, and to pack solidly against the back wall of the tube. Nevertheless, it is apparent that points X$^1$ and X$^2$ would function normally with the tube in this position, leaving both points Y$^1$ and Y$^2$ at neutral; and that, for like reasons, such action would take place *in reverse* if tube 530 is tilted to the position shown in FIG. 23, except that the mercury—at broken line 532′—would tend to climb somewhat higher, according to the rate of acceleration. If it climbed to the rear end of the tube and banked up in that position, continuing to cover points X$^1$ and X$^2$ and leaving points Y$^1$ and Y$^2$ exposed, the latter two points would not function.

But such a result would not occur, in accord with well known physical laws, whether the craft is traveling at 100 m.p.h., for example, or any speed thereabove of which it is capable, so long as a constant speed is maintained. If acceleration occurred followed by deceleration, the mercury would first bank up and thence level off again as soon as constant speed was resumed.

Figure 22:
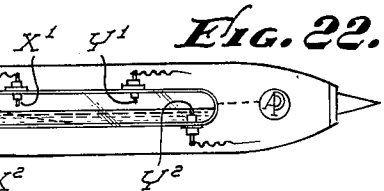
Figure 23:
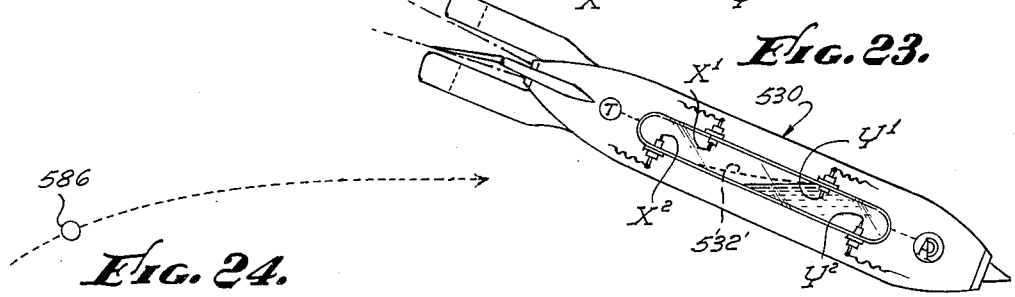

Therefore, with reference to the tubes of FIGS. 20 and 22, it may be assumed that in these neutral positions the respective dualities of upper points X and Y will be uncovered so long as the craft of FIG. 22, for instance, is in level flight at a constant speed. And the mercury in the tube of the craft of FIG. 23 would remain substantially as shown either (*a*) at constant speed or (*b*) at a decelerated speed or speeds or even (*c*) an *accelerated* speed if the rate of acceleration or deceleration is not greater than G.

Figure 27:
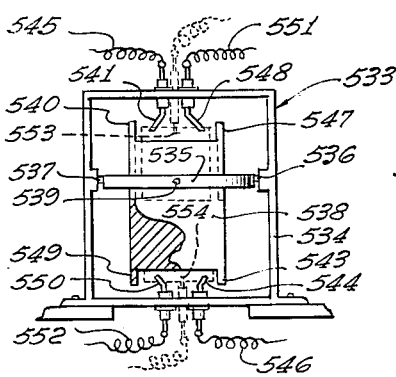

Alternative apparatus can, of course, be substituted for tube 530, the exact uses of which will be explained shortly. For example, the alternative phantom pilot 533 of FIG. 27 is seen to comprise a frame 534 supporting the inner Gimball ring 535 pivoted at points 536, 537, and the Gimball ring itself supporting inner switch-block 538 at a duality of pivot points 539. Said block, therefore, is adapted to swing in two degrees of freedom and will ordinarily be stable and null in the verticle position shown, and will continue so if frame 534 is only slightly tilted to right or left. But if frame 534 is tilted very substantially to the right, to a precise predetermined angle, the upper side-bar 540, although still vertical, will be contacted by electrode point 541 and, simultaneously, lower side-bar 543 will be contacted by electrode point 544: thus forming an electric circuit from wire 545 to wire 546.

Conversely, if said frame is tilted substantially to the left, side-bar 547 will be contacted by point 548 while bar 549 will be contacted by point 550 to form a circuit between upper and lower wires 551, 552; it being understood that the respectively named side-bars, upper and lower, are conductors and are interconnectable or in unified structure. The device of FIG. 27 is thus seen to be mechanically-electrically equivalent, substantially, to the mercury tube 530, and whose respective upper and lower control points will be similarly energized relative to the respective wires leading outwardly therefrom.

If, however, other functions are required, it is apparent that upper and lower points 553, 554—as shown in phantom outlines—may be provided for contacts with complementary side-bars similarly disposed thereto, as indicated at dotted lines; and these, too, may be in respective upper and lower dualities. It is also apparent that the device of FIG. 27 may be employed as an inexpensive automatic stabilizer for flight control when the aircraft is personally piloted.

If desired, the respective side-bars could be made movable inwardly or outwardly to widen or to restrict the mobility of the aircraft relative to each of its respective axes. The lower cut-away portion of the block 538 shows how it may be metallically overweighted below the metacenter as a means of further assisting gravity to insure quick return to the vertical, if acted upon by the relatively sudden sharp acceleration, for example, of a semi-rocket robot.

Other devices may of course, be provided as substitutes for the aforesaid phantom pilots. Thus another useful arrangement is shown in the schematic view of the semi-rocket robot of FIG. 28, wherein the simple chronometer switch—conveniently called phantom pilot 555—may have a substantial plurality of contactable switch-points 556.

Said switch, which is operable in the manner of a commutator, or in a somewhat similar relation to that of the standard timer of an automobile for actuating the spark plugs, has also the pointer 557; and it is obvious that this arm may, by predetermined actuation from the adjacent time element 558, be caused to move and to energize any predetermined successive plurality of switch-points 556 at pre-set intervals, thereby obtaining pre-designated actuation of various flight controls as symbolized by the automatic pilot-and-parker P.

Should it be desired to modify the phantom pilot apparatus of FIG. 20, whereby to correct movements tending to unstabilize the aircraft laterally, such a result may be had by incorporating an additional tube 530 mounted athwart its longitudinal axis.

As was mentioned earlier, the flight deck D' FIG. 15, may have limited rotative movement relative to the main car body, whereby to compensate for the normal but variable crabbing attitudes of the aircraft at the time of landing contact.

The precise initial distance—before landing contact—between the underside of the fuselage of the aircraft and flight deck D', as predetermined, would depend primarily upon whether the former is equipped with wheel gear, retractable skids—as in FIGS. 14 to 19—or possibly no undercarriage proper, as in the optional modification of FIGS. 10 and 13, for example, to be further described relative to the variant type of landing cradle there shown.

*Dual Operating Techniques*

Heretofore aircraft of jet propulsive types—that is, those propelled by either time rocket or airstream motors—have broadly comprised two classes: (*a*) the so-called "trajectory rockets" and (*b*) those capable of horizontal gliding flight, as initially typified by (*a*) V2 and (*b*) V1 robots, and more laterally by piloted airplanes such as the P-80 military versions. The present invention, however, introduces an aircraft which could, in one embodiment, be utilized for both trajectory and horizontal flight. Wherein trajectory operation has heretofore been contemplated, horizontal flight of the same aerodyne in the denser lower air, with adequate airfoils, was thought to be impracticable; and such dual operation is only herein rendered normally possible by the provision of wings that can be wholly, or at least very largely, retracted within the aircraft body or casing during rocketwise flight.

Said dual operation also assumes ultra high speeds in thin air or above atmosphere, as an offset to heavy fuel consumption, whereby maximum motor and fuel efficiencies may be had, for example—when the air belt—at speeds approximating the speed of the jet exhaust. Moreover, it assumes the large probability that jet engine efficiencies will hereafter be further augmented, and that improved fuels will be developed capable of delivering substantially increased mileages in proportion to the bulk thereof to be loaded and carried.

Thus, if necessary, the aircraft 429 could have both liquid fuel rocket and airstream reaction motors in multi-motored assembly. Or, for that matter, separate in-line rocket and airstream motors could be mounted in the fuselage, having side-by-side jet exhaust nozzles. Such variants are not shown graphically but will be well understood by technicians of the related art. The Bell XS1, for illustration, has multiple exhaust tubes, at least one of which could readily vent from a liquid fuel rocket motor and another from a ramjet or gas turbine.

However, according to this disclosure, it is not essential to utilize liquid rocket fuels for launchings, or for trajectories within the ceiling limits of airstream power plants; and such launchings can be effected at initial velocities so high as to measurably overcome ordinary drawbacks to the use of an airstream motor for rocket-type take-offs and for preliminary parabola flight within the relatively low ceiling limits of such units. Considering that by far the greatest density of the atmosphere is within the operative range of turbojets, for example, the ability to utilize the latter for initial propulsion while conserving rocket fuel for supersonic speeds at higher altitudes will be appreciated. Landings and landing approaches are effected with the use of airstream motors only.

The method of accomplishing such an objective comprises the use of a duality of distinctly separate but smoothly coordinated launching and landing components. Thus the initial ground speed which can be attained by the so-called ground car C' represents the first component, or stage, of such a launching operation. The coordinated thrust of the aircraft motor or motors is the other. And since exceptionally high subsonic ground speeds will be possible—doubtless within the range of 400 to 450 m.p.h. for brief periods—it is evident that an aircraft launching at such speeds will obtain immediate high efficiency from its turbojet power plant, enabling it to thence quickly reach the transonic speed range and a relatively high altitude in a fraction of the time heretofore required by non-assisted jet aircraft, having only gas turbine type motors and launching from ordinary runways.

A typical operation which includes both trajectory and horizontal flight may be described in relation to FIGS. 14 to 19 inclusive.

In FIG. 16, the semi-rocket craft 429$^b$ has already taken off from the cradle C$^a$ of the ground car C'. It is to be assumed, of course, that the aircraft was duly received aboard the car at the starting point; and, having been securely, releasably interlocked thereto, that the composite vehicle gathered speed rapidly up to a predetermined point at which at least one airstream motor on craft 429$^b$ was cut in to augment the thrust of the ground car motor or motors. For the present illustration, it will be conveniently assumed that the motor for such initial operation, on the aircraft, is a turbojet.

During the prelaunching stage, it will be desirable to maintain wings 430 fully retracted in order to minimize the drag coefficient; but as car C' approaches the predetermined take-off speed of the aircraft, the latter will be operated to extend wings 430 substantially instantaneously, their supersonic configuration enabling them to cut into the hardened air under the propulsive force of the pressurized fluid from bottle or bottles 450, for instance. The take-off can then occur coincidentally—it being understood that the aircraft turbojet motor is already operating under sufficient power to immediately further increase the acceleration of semi-rocket 429$^b$.

Cradle C$^a$ is shown to have means, in the form of a toggle-hoist 578, for raising and lowering the forward end thereof to additionally facilitate such a take-off; but whether the latter device could be employed, as a practicable proposition, in connection with craft 429$^b$ may depend largely upon the speed which can be had from car C' under load. In any event, the aircraft could quickly assume the attitude seen in FIG. 16; and shortly thereafter, under sufficient propulsion—and the control surfaces being operated accordingly—it is believed possible to largely retract wings 430 and to execute a true trajectory flight from the turbojet motor per se; such flight continuing under rapidly increasing acceleration until arrival at that altitude at which the airstream motor can no longer function efficiently.

At this time, the denser air having been traversed without having had to draw upon any of the liquid oxygen and rocket fuel, an auxiliary rocket motor can be cut in and trajectory flight continued under still greater acceleration through the thin upper air, where the sonic barrier should be penetrated without difficulty. For it is obvious that craft 429$^b$ is not now encumbered by ordinary wings; and if airfoils of the swept-back, partially retractable type shown in FIG. 3 are employed in their supersonic positions, it is believed the results would not be materially different from those obtainable by an aircraft having fully retractable wings.

As powered flight would be followed by a prolonged period of free flight, it is apparent that operations of this character would greatly enlarge upon the range of existing missiles of the V2 class, for example, even if the semi-rocket 429$^b$ were incapable of yet further navigation horizontally upon its return to the lower air; in short: to an altitude at which its airstream motor or motors are again operable.

Upon descending, the craft could resume flight with wings 430. In exceedingly thin air or in airless space it would be a simple matter to re-extend the wings without dire consequences at the then supersonic speeds of the aircraft.

Alternative Flight Patterns

While I have described one possible dual mode of operation, planewise and rocketwise, the same is not necessarily preferred. That is, it may be desirable to operate craft 429$^b$ solely within the lower air belt, with airstream motors and motor fuels exclusively. In that event, instead of continuing upward rocketwise or indefinitely according to the lead-line 579 of FIG. 18, the aircraft, following an initial climb, could level off at the altitude indicated at position 580 and continue thence along the line 581 until nearing the leading area.

At this time, it could merely descend as indicated by line 582, or less abruptly, until nearing the proximity of landing car C' of FIG. 19, when it could execute any required aerial maneuver—according to lower flight path 583, for illustration—prior to landing contact with the ground car.

Thus if car C' operates on circular trackage, craft 429$^b$ could describe a preliminary series of narrowing circles according, before being received thereaboard.

The actual landing, according to FIG. 19, need not be fully detailed, since the same will be quite obvious in view of the means and the modus operandi hereinbefore described.

FIG. 17 indicates the general appearance of craft 429$^b$ in flight, as seen from above. It is believed that the wings 430, in this drawing, are of the maximum required size, and that they may be substantially smaller than shown where normal ground landings are not contemplated. In short, if a landing on car C could be effected at a contact speed, say, of 300 m.p.h., then wings of a size for the adequate sustentation of the aircraft around and above that speed would be adequate; assuming, of course, that launchings would also be above the 300 m.p.h. figure.

In the case of aircraft 1 of FIG. 1, having bicycle main wheels 12 and 13 and bearing balls 12' and 13', comparable to elements 523' of FIG. 15, the required changes in the ground car whereby to accommodate these minor variables would be only elementary in view of the data given herein.

With respect to semi-rocket 429, landings and launchings on and from the modified cradle C$^b$ of the car C', FIG. 13, need not vary materially from those heretofore explained; it being obvious that in the absence of either skids or landing wheels, craft 429—in FIG. 10—may be provided with a plurality of retractable grippers 584 which, just prior to landing contact, could be extended as shown in FIG. 13. Grippers 584 are adapted to lock downward across the frontal side of the cradle C$^b$ and similar or any other suitable means may be utilized for effecting a like interlocking engagement relative to the rear end of the cradle, for example, against non-elected relative movements between plane and cradle.

Cradle C$^b$ has a particularly deep lower portion, including a centrally disposed longitudinal slot extending entirely therethrough; said slot being of a depth to afford clearance for the lower fin 585. Adequate streamlining of such a structure can be delegated to those regularly engaged in matters of design detail.

It is apparent that in the dual mode of operation previously given, a possible further variation of technique could involve launching the aircraft immediately as a trajectory rocket but changing over to turbojet or ramjet propulsion, including horizontal flight as elected, at a predetermined moment thereafter.

It is evident, however, that whether or not aircrafts 429 and 429$^b$ are operated as robots, the aforesaid "phantom pilots" may be normally utilized.

According to the apparatus and the methods disclosed, it is theoretically possible for either of said craft to be flown from coast to coast in the continental United States, launching from one ground car C' at Los Angeles, for example, and landing on another thereof at New York City, after having flown most of the intervening distance at supersonic speeds. And continent to continent flights could be similarly executed.

It is contemplated, in short, that such craft could home upon very widely spaced range beacons; and that a sufficiently powerful beacon in the British Isles, for example, would be adequate for their automatic guidance across the Atlantic—in conjuncture, however, if need be, with intermediary beacons carried by ships at sea traveling known schedules. Such intermediary homes could be cut in or cut out as required, the craft passing from the control of first one and then another of the same.

It is evident that whether or not aircraft 429 and 429ᵇ are operated as robots, the aforesaid phantom pilot may be normally utilized. It is, for example, obvious that tube 530 would be required (in robot operation) for executing the major turning movements according to the techniques given relative to FIGS. 16, 18 and 19.

Figure 24:
Figure 25:
Figure 26:

One such a transitory movement could be executed at the area 586, FIG. 24, and another at area 587, FIG. 25, following a prolonged period of horizontal flight. Again, at the culmination of a full trajectory operation, as at area 488 of FIG. 26, the phantom pilot 430 could function automatically according to the method earlier explained relative to FIG. 23.

The operation of the invention, in its different phases, has been indicated throughout the progress of the description.

The embodiments herein, moreover do not, of course, represent the precise limitations of my concept but are given merely to illustrate certain means and modes which, insofar as can be presently assumed by this applicant, are preferred forms of the invention. Hence no limitation is to be inferred therefrom, or otherwise except as set forth in the allowable claims.

Where such terms as "segment" or "section" have been used to define one of the major components of a wing— segments 145 and 146, for example—either in the claims or the description, and wherein it is quite clear that a lesser wing portion is not thereby indicated, the former interpretation should be given.

I claim:

1. In an aircraft having a main body structure and right and left extensible, retractable wing members for its primary airborne sustentation, that modification, in combination, wherein an outwardly disposed segment of each such wing member, including the leading edge thereof, is of permanently rigid construction and wherein a flexible, fluidly inflatable, deformingly deflatable segment thereof—including an outermost skin portion thereof—is connected to said rigid segment.

2. In an aircraft having a main body structure and right and left wing members for its sustentation in airborne flight, that modification, in combination, wherein each such wing member includes a permanently rigid, outwardly disposed segment thereof and a flexible, fluidly inflatable segment connected to said rigid segment; and wherein the permanently rigid segment is mounted for swingable movement generally outwardly from and inwardly to said body structure; means being provided to positively, rigidly, lock each outer segment of said wings— when fully extended—against movements thereof relative to said body, and cooperating other means to lock said same segments against relative movements thereof when in fully retracted positions.

3. In an aircraft, the combination including a main body portion thereof and a wing member therefor constituting one component of the main sustaining airfoil means of said craft in gliding flight; said wing member having a permanently rigid, outwardly disposed segment in unitary structure with a fluidly inflatable, inwardly disposed segment connected to said first rigid segment; and means operable to impart retractive or extensible movement, electively, to each of said segments relative to said body portion.

4. In an aircraft having right and left partially retractive wing members, respective outermost sections of which are of permanently rigid construction and largely non-retractable from the airstream, that modification wherein each such wing member includes an inwardly disposed, normally inflatable, deflatable, and largely retractable section thereof integral with its corresponding outermost rigid section; strut means being provided to extend laterally from the main aircraft body, through the respective inwardly disposed segments, for interlocking relations with each of said outermost wing sections.

5. In an aircraft, the combination comprising a fuselage and at least one airfoil therefor, major segments of which airfoil include: an inwardly disposed, inflatable, deflatable, and retractable segment and an outwardly disposed, partially retractive, permanently rigid segment connected thereto; casing means for the respective segments; at least one arcuately formed horn member extending outwardly from the fuselage—through the inner segment—in a position to be engaged, for relative movements in respect thereto, by a member complementary thereto and carried within the casing means of said outwardly disposed segment; and cooperating means on the respective horn and horn engaging components, through the interaction of which said outwardly disposed segment is adapted to be releasably locked in an elected either one of a plurality of its positions relative to said fuselage.

6. In an aircraft having right and left partially retractive wing members of the swept back type when fully extended the combination with the airframe main body wherein said wing members comprise respective forwardmost, permanently rigid, normally non-deformable sections thereof, including the entire leading edge portions thereof, as well as generally inwardly disposed, normally deformable, and operatively re-formable sections interconnected with said permanently rigid sections; these latter named right and left segments being, in themselves, of a sufficient size and structural characterization to serve as the primary sustaining airfoil means of said craft when traveling at its optimum speeds—said inwardly disposed sections being, at such times, in normally deformed positions—and said combination further including means for electively moving said wing members in unison, from one angular positon thereof to another, forwardly or backwardly, as well as from one fixed flight position to another in rigidly locked relations, relative to the longitudinal axis of said main body portion of the aircraft.

7. In an aircraft: the combination, with the main airframe body, which includes at least one subsidiary airfoil of the class commonly identified as a stabilizer forming one component of the aircraft empennage; and means, in structure, for enabling said airfoil to be partially deformingly retracted while in flight; said airfoil having a forwardmost, permanently rigid segment, which includes the leading edge thereof, and a segment generally rearwardly and inwardly of said forwardmost segment which is, per se, operatively collapsible; means being provided to electively collapse only said latter named segment of the airfoil.

8. As a new component in aircraft construction, applicable expressly to airplanes of the retractive-protractive wing type: (1) a main sustaining wing member having an outwardly, forwardly disposed, permanently rigid section and a generally inwardly disposed, deformably collapsible section; and (2) a strut-engaging means carried within the interior of said wing member, said strut-engaging element constituting a means for enabling it to support the protruded section of at least one strut member complementary thereto, and extensible laterally outwardly thereto, from the main body portion of an aircraft; said strut-engaging means having frequent movement relative to said strut member, inclusive of interlockings rigidly therebetween, in the course of the normal retractive-protractive relations of said wing.

9. As a new element for airplanes: an ultra high-speed wing therefor, said wing being extensible retractively from one flight position thereof to another, and of a distinctly swept back configuration when operating in its fully extended position but especially characterized in that a substantial frontal segment thereof, including the leading edge, is of permanently rigid construction while a major rearward segment of said wing, including a substantial trailing edge portion thereof, is operably collapsible incidental to its movement to at least one less extended flight position; means being provided on said wing for enabling it to be rigidly interlocked to the main body of an airplane in one or another of said positions.

References Cited in the file of this patent

UNITED STATES PATENTS

| | | |
|---|---|---|
| 1,065,506 | Constantin | June 24, 1913 |
| 1,215,295 | MacKay | Feb. 6, 1917 |
| 1,427,257 | Bowen | Aug. 29, 1922 |
| 1,545,553 | Dillingham | July 14, 1925 |
| 1,556,560 | MacMechen | Oct. 6, 1925 |
| 1,590,880 | Broquist | June 29, 1926 |
| 1,627,185 | Krammer | May 3, 1927 |
| 1,793,349 | Andersson | Feb. 17, 1931 |
| 1,834,399 | Helmer | Dec. 1, 1931 |
| 1,842,613 | Karr | Jan. 26, 1932 |
| 1,857,960 | Johnson | May 10, 1932 |
| 1,866,596 | Hendrickson | July 12, 1932 |
| 1,871,476 | Sperry | Aug. 16, 1932 |
| 1,887,148 | De Ganahl | Nov. 8, 1932 |
| 1,904,281 | Ellingston | Apr. 18, 1933 |
| 1,905,298 | McDaniel | Apr. 25, 1933 |
| 1,912,722 | Perkins | June 6, 1933 |
| 2,074,897 | Everts | Mar. 23, 1937 |
| 2,075,788 | Adams | Mar. 23, 1937 |
| 2,131,528 | Soyer | Sept. 27, 1938 |
| 2,134,653 | Hill | Oct. 25, 1938 |
| 2,143,137 | Basim | Jan. 10, 1939 |
| 2,162,066 | De Asis | June 13, 1939 |
| 2,246,716 | Bottrill | June 24, 1941 |
| 2,249,729 | Fitzurka | July 22, 1941 |
| 2,303,695 | Johnson | Dec. 1, 1942 |
| 2,364,527 | Haygood | Dec. 5, 1944 |
| 2,371,670 | Beddow | Mar. 20, 1945 |
| 2,400,388 | Campbell | May 14, 1946 |
| 2,421,870 | Dornier | June 10, 1947 |
| 2,423,095 | Gibson | July 1, 1947 |
| 2,432,359 | Streid | Dec. 9, 1947 |
| 2,436,240 | Wiertz | Feb. 17, 1948 |
| 2,444,332 | Briggs | June 29, 1948 |
| 2,471,599 | Young | May 31, 1949 |
| 2,504,421 | Johnson et al. | Apr. 18, 1950 |

FOREIGN PATENTS

| | | |
|---|---|---|
| 26,004 | France | Mar. 19, 1923 |
| | (Addition to No. 542,649) | |
| 302,232 | Great Britain | Mar. 5, 1932 |
| 276,911 | Italy | Aug. 22, 1930 |
| 637,043 | Germany | Oct. 19, 1936 |
| 816,813 | France | May 10, 1937 |
| 526,162 | Great Britain | Sept. 12, 1940 |
| 49,151 | France | Aug. 23, 1938 |
| | (Addition to No. 832,912) | |